United States Patent [19]

Steckert et al.

[11] Patent Number: 4,867,438

[45] Date of Patent: Sep. 19, 1989

[54] LIGHT WEIGHT WALKER

[76] Inventors: John Steckert; Jessie M. Steckert, both of 7715 Lacorn Ct., Normandy, Mo. 63121

[21] Appl. No.: 327,297

[22] Filed: Mar. 22, 1989

Related U.S. Application Data

[63] Continuation-in-part of Ser. No. 131,883, Dec. 11, 1987, abandoned.

[51] Int. Cl.⁴ .......................... A61H 3/00; B62B 1/00

[52] U.S. Cl. .......................... 272/70.3; 135/67; 280/47.2; 280/87.051; 297/5

[58] Field of Search .......................... 272/70.3, 70.4, 93, 272/70; 280/87.02 W, 47.34, 87.02 R, 47.2, 651, 43.14; 135/67, 74, 85; 297/5, 6; 414/490, 426, 428

[56] References Cited

U.S. PATENT DOCUMENTS

| | | | |
|---|---|---|---|
| 1,729,557 | 9/1929 | Stoll | 272/70.3 |
| 2,470,685 | 5/1949 | Brown | 280/47.3 |
| 3,112,042 | 11/1963 | Leshner | 280/47.2 |
| 4,211,309 | 7/1980 | Ruggiero | 272/70.3 |
| 4,284,286 | 8/1981 | Lewallen | 280/47.2 |
| 4,700,730 | 10/1987 | Samuelson et al. | 272/70.3 |

*Primary Examiner*—S. R. Crow

*Attorney, Agent, or Firm*—Gravely, Lieder & Woodruff

[57] ABSTRACT

This walker is designed to be light in weight and fold for compact storage. Primarily, it consists of a U-shaped main frame with wheels for rolling engagement with the ground, and an upper handle portion is provided and is telescopingly received on the main frame, so as to be adjustable for the heights of various individuals. A second pivotal frame is connected to the main frame and is provided for ground support in cooperation with the wheels of the main frame.

11 Claims, 2 Drawing Sheets

LIGHT WEIGHT WALKER

REFERENCE TO PRIOR APPLICATION

This application is a continuation-in-part of Ser. No. 131,883 filed Dec. 11, 1987 entitled LIGHT WEIGHT WALKER, now abandoned.

BACKGROUND OF THE INVENTION

1. Field of the Invention

This invention relates to medical walking aid devices, and more particularly, to a light weight walker.

2. Description of Prior Art

Devices have been devised in the prior art that are adapted for providing walking support for persons, but while such devices may be suitable for the purpose to which they address, they do not achieve all of the objects and advantages of the present invention.

The principal object of this invention is to provide a light weight walker which will easily fold for storage and carrying purposes.

Another object of this invention is to provide a light weight walker that is readily adjustable, so as to be employed by persons of various heights, and which is very sturdy in construction.

A further object of this invention is to provide a light weight walker which is simple in design, easy to use, and inexpensive to manufacture.

Still another object of this invention is to provide a walker which is foldable, adjustable in height, provides continuous rolling support so that it does not have to be lifted with each step, and which has a rear support which also acts as a brake for the device.

These and other objects and advantages will become apparent hereinafter.

SUMMARY OF THE INVENTION

The present invention concerns a light weight walker, comprising a folding reinforced cross braced main frame having wheels thereon, and a telescopically adjustable upper handle portion for enabling the walker to be used by persons of various heights. A second pivotal frame is also provided for ground support in cooperation with the wheels of the structure.

BRIEF DESCRIPTION OF FIGURES

In the drawings wherein like numerals refer to like parts wherever they occur.

DETAILED DESCRIPTION

Figure 1:
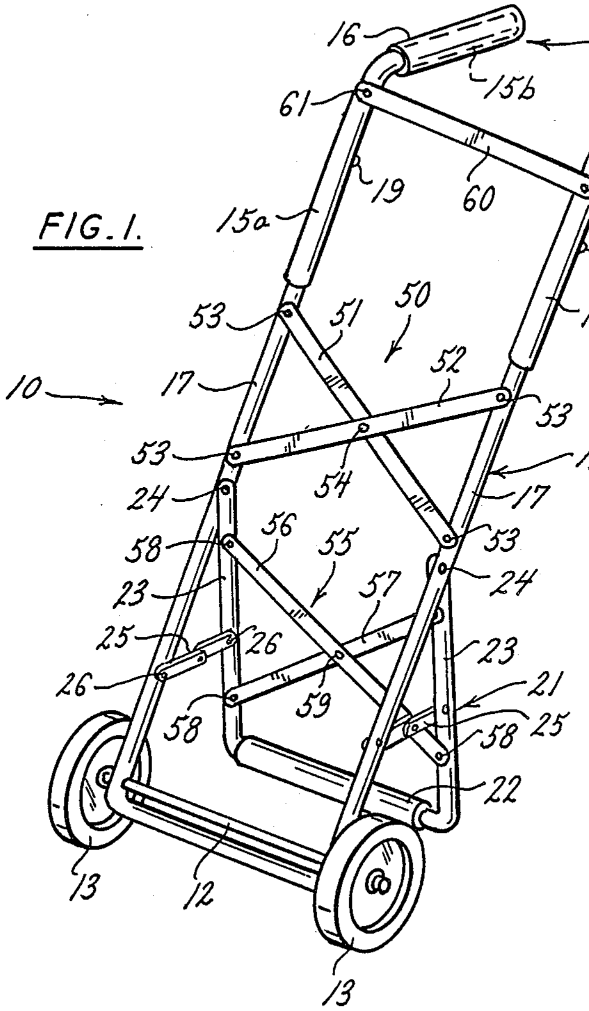
FIG. 1 is a perspective view of the instant invention.
Figure 5:
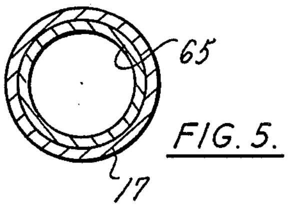
FIG. 5 is a sectional view taken along line 5—5 of FIG. 2.
Figure 3:
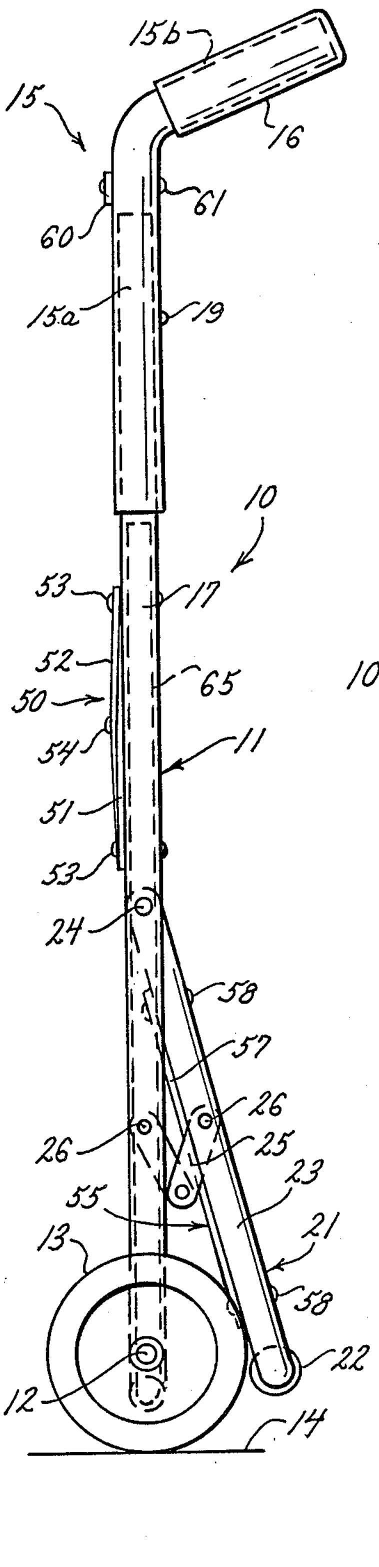
FIG. 3 is a side view of the invention.
Figure 2:
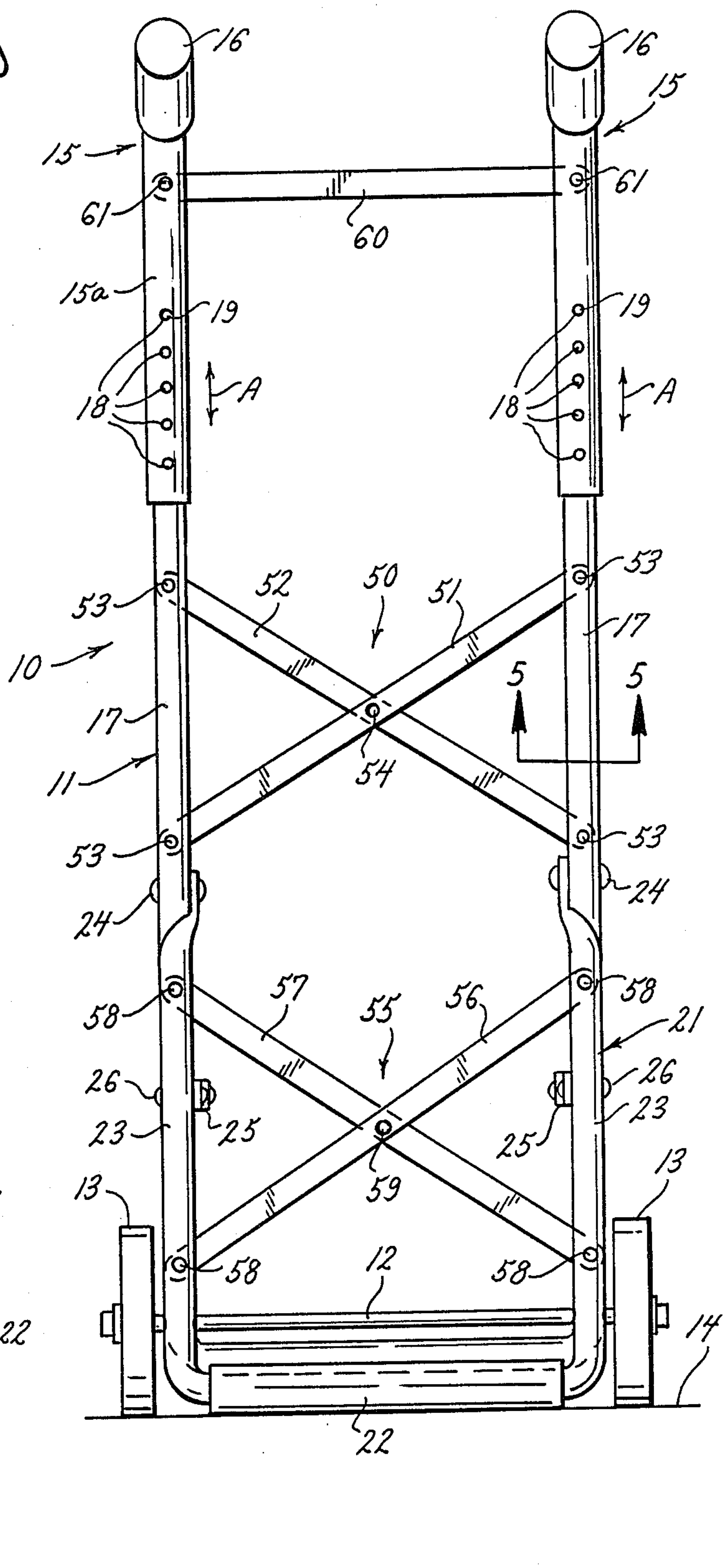
FIG. 2 is a rear view of the invention.

FIGS. 1–3 show a walker 10 which includes a main frame 11 of U-shaped tubular construction. An axle 12 is fixedly secured to and projects from the outside of the bottom portion of the frame 11. The wheels 13 are freely and rotatably mounted on the axles 12, for engagement with a ground surface 14, to prevent having to totally lift the walker 10 as must be done with the prior art types. Each side of the frame 11 terminates in an elbow shaped handle 15 which has an elongated body 15a and an inturned end 15b on which a handle grip 16 is positioned for placement of the hands of a user. The handles 15 are telescopingly received on the ends of the upstanding legs 17 of the main frame 11.

Figure 6:
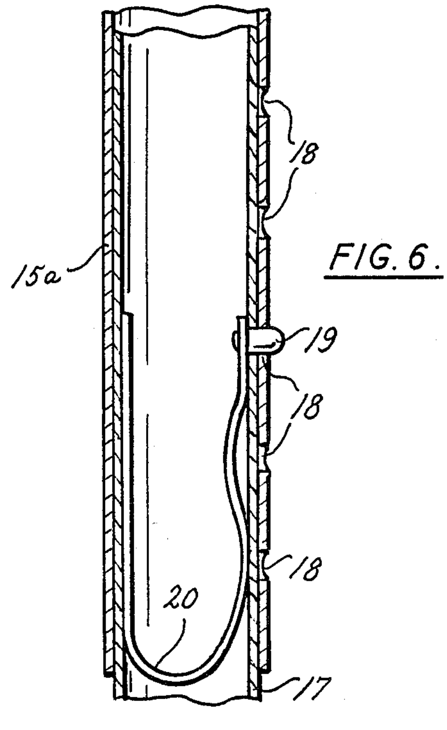
FIG. 6 is a fragmentary sectional view showing the details of the height adjustment for the handle.

A plurality of spaced openings 18 are positioned transversely through the handle bodies 15a and receive spring loaded fasteners 19 with stud portions positioned in the legs 17, so as to adjust the elevation of the handle 15 for persons of different heights, as indicated by the arrows "A" in FIG. 2. The details of this arrangement are shown in FIG. 6 and include the fastener 19 and a resilient spring retainer 20 frictionally held in the leg 17. The retainer 20 urges the fastener 19 outwardly through the leg wall 17 and toward the handle body opening 18.

A second pivotal frame 21 is provided and is also U-shaped in configuration. The frame 21 includes a non-slip non-rotatable tubular grip sleeve 22 thereon, which is similar to the grip 16 of the handle 15, only, the sleeve 22 provides for engagement with the ground surface 14. Thus the rear frame 21 acts as a brake on the walker 10 when in engagement with the ground 14. The ends of the legs 23 of the frame 21 are pivotally fastened to the frame 11 by fasteners 24. A pair of folding hinges 25 are fastened to the legs 23 and the legs 17 by fasteners 26. A hinge 25 is positioned between the legs 23 and 17 on each side of the walker 10. The foregoing arrangement is designed to enable folding of the second frame 21 for storage when the walker 10 is not in use as shown in FIG. 3.

To strengthen and rigidify the frame members 11 and 21, an X-shaped cross brace 50 interconnects the legs 17. The cross brace 50 on the main frame 11 comprises struts 51 and 52 which are fastened to the legs 17 at their ends by fasteners 53 and fastened together at their centers by fastener 54.

The cross brace 55 on the second frame 21 comprises struts 56 and 57 which are fastened to the legs 23 of their ends by fasteners 58 and are fastened together at their centers by fasteners 59.

A brace 60 connects the handles 15 at the point where the grips 16 terminate. The brace 60 is fastened to the handles 15 by fasteners 61.

The legs 17 are strengthened and rigidified by an inner tubular member 65 which extends along a substantial portion of each leg 17 to a double walled tube.

In use, the second frame 21 is pivoted away from the main frame 11 until the folding hinges 25 are locked. The handle 15 is then elevated or lowered to fit the user, by placement of the fasteners 19 in the appropriate openings 18, and the user employs walker 10 by alternately disengaging second frame 21 from the ground surface 14, as he walks forward.

Figure 4:
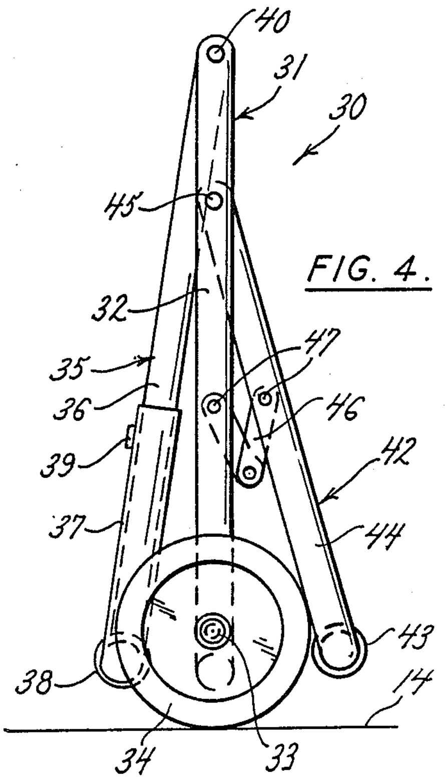
FIG. 4 is a side view of a modified form of the invention.

Looking now at FIG. 4 of the drawing, a modified form of walker 30 is designed to fold into a more compact condition, and includes a main frame 31 having legs 32 and a pair of axles 33 with wheels 34, for rolling engagement with the ground surface 14. The frame 31 has a rotatable upper frame portion 35 whose legs 36 are telescopingly received within a U-shaped handle 37 having a handle grip 38 mounted thereon. Fasteners 39 are received in the handle 37 for tightening the handle 37 in any desired elevation on the legs 36, and fasteners 40 secure the legs 36 to the main frame legs 32.

A U-shaped third frame 42 is provided and includes a non-slip sleeve 43 and legs 44 which are pivotally fastened to the main frame 31 by fasteners 45. A pair of folding hinges 46 are pivotally fastened to the third frame 42 and the main frame 31 by fasteners 47 so as to enable the third frame 42 to pivot outward and lock when the walker 30 is used.

In use, the walker 30 functions in the same manner as was heretofore described of the walker 10, with the exception, that the second pivotal frame member 35 is pivoted downward when the walker 30 is not in use, and the fasteners 40 are of such design as to lock the main frame 31 and the upper frame portion 35 in vertical position.

While various changes may be made in the detailed construction, such changes will be within the spirit and scope of the present invention, as defined by the appended claims.

What is claimed is:

1. A lightweight walker comprising (a) a main frame of generally U-shaped configuration with the free ends of the legs of the "U" upstanding, (b) an axle fixed to and having ends projecting outwardly from the main frame adjacent to the base of the "U", (c) wheels rotatably connected to the axle ends for engaging a ground surface, (d) a handle adjustably positioned on the legs of the U-shaped main frame, (e) means for adjusting the height of the handle with respect to the ground surface, (f) a second frame member of generally U-shaped configuration having the free ends of the legs of the "U" pivotally connected to the legs of the main frame and movable between a walking position toward the user and a carrying position adjacent the main frame, (g) a non-rotatable sleeve positioned on the base of the "U" of the second frame member, said sleeve being of a non-slip and resilient material for frictionally engaging the ground surface and functions as a brake for the walker when in engagement with the ground surface, and (h) folding hinge means positioned between and fastened to the legs of the main frame and the legs of the second frame on each side of the walker for locking the second frame in walking position and for folding said second frame adjacent the main frame in carrying position.

2. The light weight walker of claim 1 wherein the legs of the main frame are hinged between their free ends and the points where they are connected to the second frame legs whereby the main frame can be folded upon itself to facilitate storage in a compact folded condition.

3. The light weight walker of claim 1 wherein the handles are elbow shaped with body portions telescopingly received on the ends of the legs of the main frame and the height adjustment means includes spaced transverse openings in the handle body and removable spring loaded fastening means positioned in the main frame legs.

4. The walker of claim 3 wherein the fastening means comprises a resilient body positioned in the main frame legs and a stud mounted on one end of the body and urged into engagement with an opening in the handle body by the resilient body.

5. The light weight walker of claim 3 wherein the handle has grip means for engaging the hands of the user.

6. The walker of claim 1 including a cross-shaped brace interconnecting the main frame legs.

7. The walker of claim 1 including a cross-shaped brace interconnecting the second frame legs.

8. The walker of claim 1 including an arm fastened to each handle and interconnecting said handles.

9. The walker of claim 1 including reinforcing means positioned within the main frame legs.

10. The walker of claim 9 wherein the reinforcing means are tubular members and the main frame legs are double walled tubes over a substantial portion of their length.

11. The walker of claim 4 including a cross-shaped brace interconnecting the main frame legs, a cross-shaped brace interconnecting the second frame legs, an arm fastened to each handle and interconnecting the same, and a second tubular member positioned in each main frame leg over a substantial portion of their lengths.

* * * * *